United States Patent [19]

Miyake

[11] Patent Number: 4,774,595
[45] Date of Patent: Sep. 27, 1988

[54] RECORDING AND REPRODUCING APPARATUS WITH MAGNETIC HEAD PROTRUDED ONTO SHEET OF MAGNETIC RECORDING MEDIUM

[75] Inventor: Izumi Miyake, Kaisei, Japan

[73] Assignee: Fuji Photo Film Co., Ltd., Kanagawa, Japan

[21] Appl. No.: 763,714

[22] Filed: Aug. 8, 1985

[30] Foreign Application Priority Data

Aug. 11, 1984 [JP] Japan .................................. 59-167298

[51] Int. Cl.⁴ ....................... H04N 9/79; H04N 5/781; G11B 5/54
[52] U.S. Cl. ...................................... 358/327; 360/73; 360/78
[58] Field of Search ...................... 360/73, 75, 137, 69, 360/99, 133, 105–107; 358/310, 322, 327

[56] References Cited

U.S. PATENT DOCUMENTS

| | | |
|---|---|---|
| 4,074,330 | 2/1978 | Norton et al. . |
| 4,171,406 | 10/1978 | Yamaguchi et al. . |
| 4,365,258 | 12/1978 | Geyer et al. . |
| 4,388,368 | 6/1983 | Hibino et al. . |
| 4,388,376 | 6/1983 | Kuboto . |
| 4,414,592 | 11/1983 | Losee et al. . |
| 4,415,942 | 11/1983 | Frosch et al. . |
| 4,449,139 | 5/1984 | Geyer . |
| 4,466,032 | 8/1984 | Saito . |
| 4,537,824 | 8/1985 | Asano et al. . |
| 4,604,663 | 8/1986 | Moribe et al. .......................... 360/73 |
| 4,646,179 | 2/1987 | Nagashima et al. .................... 360/99 |
| 4,661,871 | 4/1987 | Nagashima ............................. 360/99 |

FOREIGN PATENT DOCUMENTS

| | | | |
|---|---|---|---|
| 3415412 | 12/1984 | Fed. Rep. of Germany ........ 360/97 | |
| 54-17708 | 9/1979 | Japan . | |
| 55-108963 | 8/1980 | Japan ..................................... 360/69 | |
| 55-157161 | 12/1980 | Japan . | |
| 57-113460 | 7/1982 | Japan . | |
| 57-113459 | 7/1982 | Japan . | |
| 57-113466 | 7/1982 | Japan . | |
| 57-164473 | 10/1982 | Japan ..................................... 360/69 |
| 58-29177 | 2/1983 | Japan ................................... 360/137 |
| 58-17519 | 7/1983 | Japan . |
| 59-33666 | 2/1984 | Japan . |

OTHER PUBLICATIONS

IBM Technical Disclosure Bulletin, vol. 6, No. 9, Feb. 1964, pp. 57–58, "Pressure Pad for Magnetic Heads", by Bond.

IBM Technical Disclosure Bulletin, vol. 18, No. 3, Aug. 1975, pp. 895–896, "Magnetic Disk Recording With Transducer Gaps Disposed End-To-End", by Bowen.

Primary Examiner—Donald McElheny, Jr.
Attorney, Agent, or Firm—Birch, Stewart, Kolasch, & Birch

[57] ABSTRACT

A magnetic recording or reproducing apparatus in which a magnetic head is projected beyond a regulation level of a rotating sheet of magnetic recording medium against the sheet for magnetic recording or playback. The apparatus includes a driver unit for driving the sheet in steady rotation, a sensor device for sensing the rotational speed of the sheet, a head transport mechanism for transporting the magnetic head radially across a recording surface of the sheet, and control circuitry for controlling the driver unit, sensor device and head transport mechanism for causing the magnetic head to be transported to a desired one of tracks of the sheet for effecting tracking. The control circuitry, when the apparatus is powered on, causes the driver unit to rotate the sheet, and inhibiting the head transport mechanism from transporting the magnetic head until the rotational speed of the sheet sensed by the sensor device reaches a predetermined value.

5 Claims, 3 Drawing Sheets

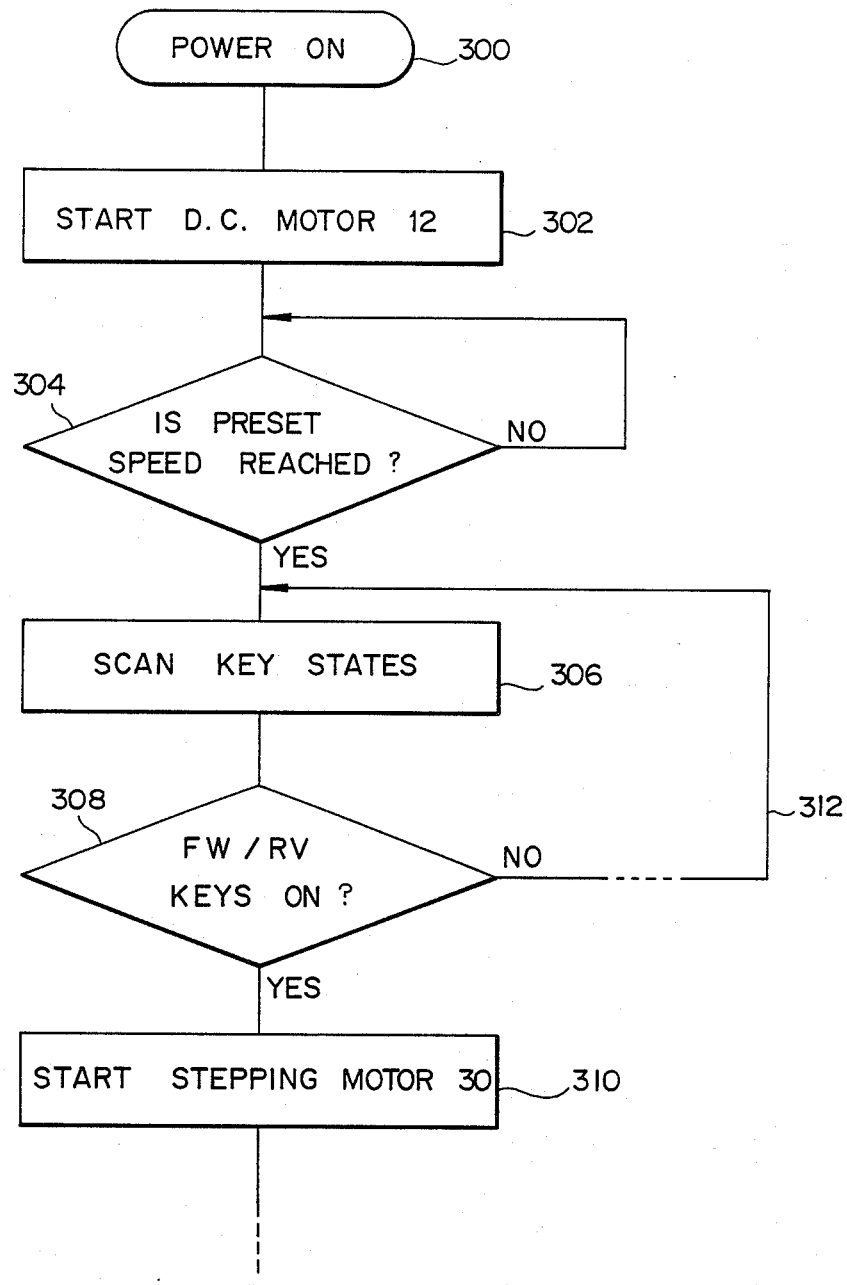

RECORDING AND REPRODUCING APPARATUS WITH MAGNETIC HEAD PROTRUDED ONTO SHEET OF MAGNETIC RECORDING MEDIUM

BACKGROUND OF THE INVENTION

1. Field of the Invention

The present invention relates to a magnetic recording or reproducing apparatus, and more particularly to such apparatus wherein information is recorded on, or reproduced from, a rotating magnetic recording medium, such as magnetic disk or magnetic drum.

2. Description of the Prior Art

Recently, there has evolved an electronic still camera system which includes an imaging device, such as a solid-state image sensor or an image pickup tube, together with an inexpensive magnetic recording medium of a relatively larger storage capacity, such as a magnetic disk. In such a camera system, a still image of an object is taken to be recorded electronically on a disk, when driven in rotation, and images recorded thereon are reproduced on a separate television system or a printer.

In such an electronic still camera system, the magnetic recording medium may be, for example, a small-sized disk with a diameter on the order of 50 millimeters on which are recorded 50 tracks with a track pitch about equal to 100 $\mu$m with the track width and the guard band width being on the order of 50 to 60 $\mu$m and 50 to 40 $\mu$m, respectively. In the recording or reproducing apparatus, the magnetic disk is rotated at a constant speed of, for example, 3,600 r.p.m. for recording or reproducing video signals at the field or frame rate.

The magnetic disk of such small size and thickness is usually contained in a plastic molded package for usual handling and especially for both recording and reproducing operations. That is, the magnetic disk thus contained in the package is loaded in position in the recording or reproducing device, and driven in rotation for recording or reproduction.

In order to effect high density recording on a magnetic sheet of small size and thickness, a magnetic head is projected beyond a reference or regulation level of the magnetic sheet, which level is defined by the chucking portion of a driving spindle, which is chucked to the core of the magnetic disk to cause rotation of the magnetic sheet, thereby achieving an optimum contact of the magnetic head with the recording surface of the magnetic disk. With the magnetic head protruded in this manner, the magnetic sheet tends to be deviated or retracted in the same direction as that of the magnetic head. Such deviation or retraction of the magnetic sheet is controlled by providing a regulator plate on the opposite side of the sheet with respect to the magnetic head.

In the magnetic recording or reproducing apparatus, the power source is disconnected in many cases from the apparatus whilst the magnetic head is resting on the magnetic sheet. Although the foremost part or chip of the magnetic head shows a larger mechanical strength in connection with sliding contact with the magnetic sheet along the track thereof, it has a lower mechanical strength in a direction normal to the track of the magnetic sheet. The result is that, when the power source is turned off with the head projecting as described above, and the head is radially transported in this state for selecting a desired one of the tracks upon connecting the power source to the apparatus, the head chip is most likely to be injured.

SUMMARY OF THE INVENTION

It is therefore an object of the present invention to provide a magnetic recording or reproducing apparatus in which a mechanical injury to the magnetic head caused by the head transportation upon starting the apparatus is minimized.

BRIEF DESCRIPTION OF THE DRAWINGS

The various features and advantages of the present invention will become more apparent from the consideration of the following detailed description taken in conjunction with the accompanying drawings in which:

FIG. 3 is a flow chart showing typical operational sequences of the control unit in the embodiment shown in FIG. 1.

DESCRIPTION OF THE PREFERRED EMBODIMENT

A preferred embodiment of the present invention will be described in detail by referring to the accompanying drawings.

Figure 1:
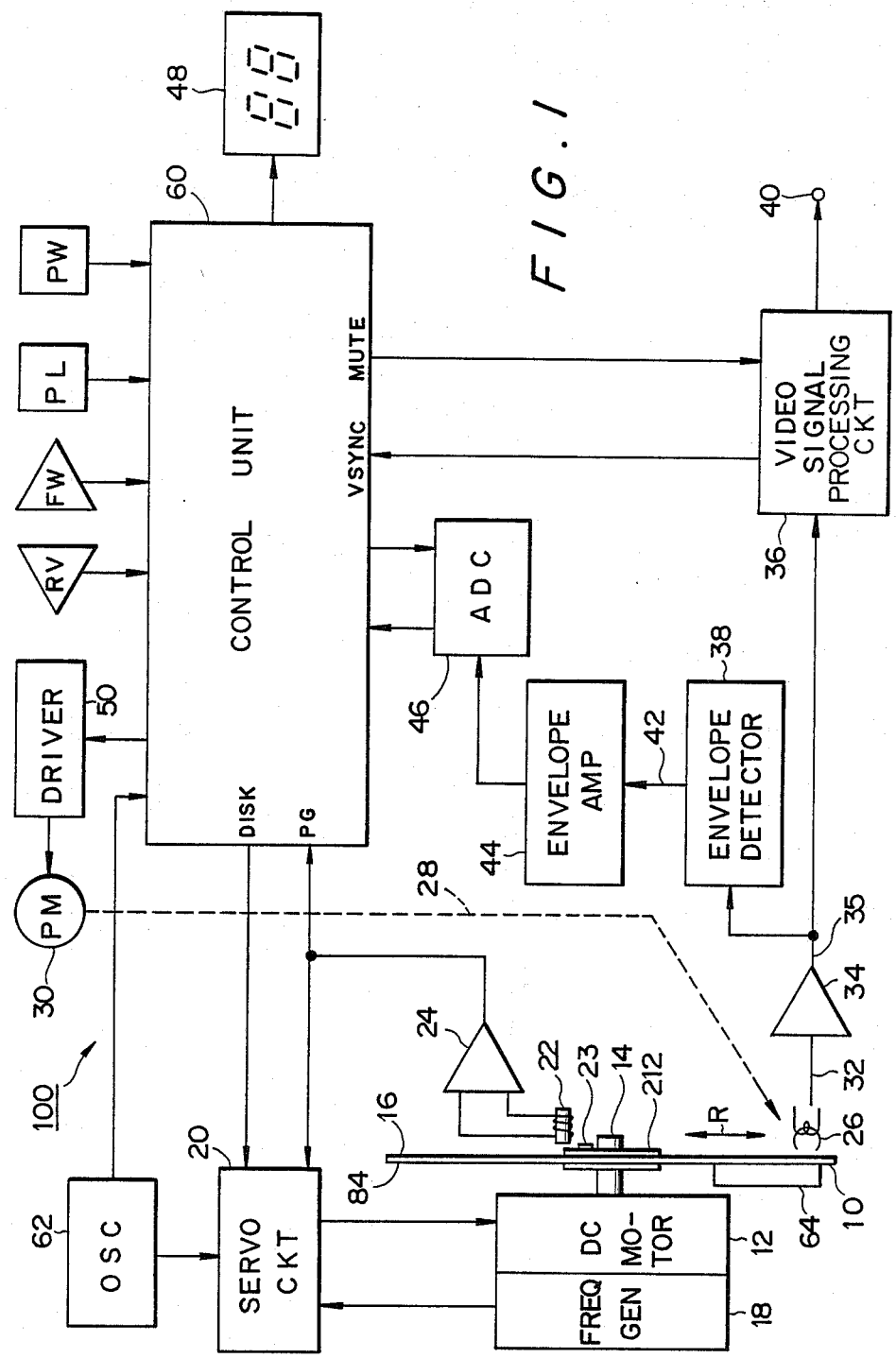
FIG. 1 is a block diagram showing an embodiment of magnetic recording apparatus in accordance with the present invention.

In the apparatus of the embodiment shown in FIG. 1, a magnetic recording medium such as magnetic disk 10 is removably mounted to a spindle 14 of a d.c. electric motor 12. When the magnetic disk 10 is loaded in position in an image reproducing apparatus 100, the foremost part or chip of the spindle 14 is chucked by a core 212 so as to allow for high-speed rotation of the disk 10. In the present embodiment, the magnetic disk 10 is comprised of a sheet of magnetic recording material about 50 millimeters in diameter, and a plurality of, for example, 50 recording tracks may concentrically be recorded on the recording surface 16 of the disk 10 with a track pitch, i.e. an interval between the adjacent tracks of the order of 100 $\mu$m. Signals recorded on these tracks in the present embodiment are video signals which may be color video signals comprised of frequency modulated luminance, chrominance and synchronizing signals. These video signals are recorded on the disk for raster scanning in such a manner that color video signals corresponding to one field of a reproduced picture are recorded on each track.

The d.c. electric motor 12 has a frequency generator 18 for generating a.c. frequency signals, and is powered by a servo circuit 20 by means of which it is controlled for rotating the disk 10 at a preset r.p.m., such as 3,600 r.p.m. The servo circuit 20 is connected to a control unit 60 adapted for controlling the overall system, and is designed to control the rotation of the disk 10 in response to a signal DISK.

A phase generator 22 is provided at a predetermined position in the vicinity of the recording surface 16 of the disk 10, and connected to the servo circuit 20 and the control unit 60 through an amplifier 24. The phase generator 22 operates to pick up timing mark 23 provided at a predetermined positions of the recording surface 16 for forming a series of timing pulses PG.

On the recording surface 16, a magnetic head or transducer 26 is supported by a supporting unit 28. As schematically indicated by the dotted line 28, the supporting unit 28 is driven by a stepping motor (PM) 30, for transporting the head 26 in both radial directions of the recording surface 16 for selecting a desired one of the tracks recorded on the recording surface 16.

Figure 2:
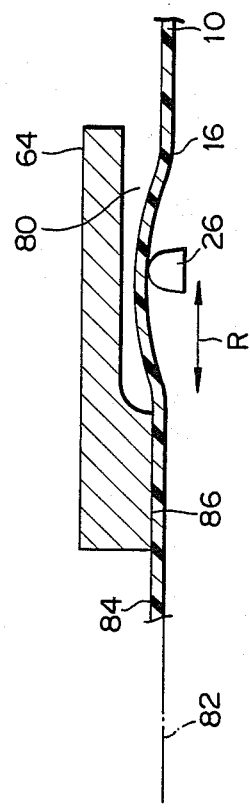
FIG. 2 is an enlarged cross-sectional view showing a portion of FIG. 1 and especially showing the relative disposition of the magnetic head, magnetic disk and regulator plate.

A regulator plate 64 is mounted on a surface 84 opposite to the recording surface 16 of the magnetic disk 10. As shown in enlarged section in FIG. 2, the regulator plate 64 has a guide surface 86 adapted to slidingly contact with the back surface 84 of the magnetic disk 10, and a recess 80 formed in the region in which the magnetic head 26 is moved. The magnetic head 26 is adapted for projecting into the recess 80 of the regulator plate 64 for playback beyond the regulation level 82 of the disk 10.

In the present specification, the term "regulation level" is directed to the level which is defined in a direction normal to the recording surface 16 of the disk 10 when the magnetic head 26 is projected in that manner against the surface 16 of the magnetic sheet 10 with the back surface 84 of the sheet 10 in contact with the guide surface 86 of the regulator plate 64. The regulation level stays lower than the level of the guide surface 84 of the rgulator plate 64 by the amount of the total thickness of the disk 10. For playback, the magnetic head 26 is projected beyond the regulation level toward the regulator plate 64.

The magnetic head 26 of the present embodiment is designed to have only the playback function, that is, the head 26 is designed to pick up video signals already recorded on the recording surface 16 to convert them into associated electrical signals. Since the disk 10 is rotated at a constant speed of 3,600 r.p.m., video signals recorded on one track, i.e. a field of frequency-modulated video signals are reproduced from the magnetic head 26 upon each revolution of the disk 10, that is, each one sixtieth of a second. Upon demodulation, these video signals turn out to be compatible with a desired standard color television signal format, such as NTSC.

The playback output 32 of the magnetic head 26 is connected through a preamplifier 34 to a video signal processing circuit 36 and an envelope dectection circuit 38. The video signal processing circuit 36 is designed to process video signals sensed by the magnetic head 26 into composite color video signals of, for example, the NTSC format, which are supplied to an output 40. The circuit 36 is designed to extract vertical sync signals VSYNC from the NTSC format composite color video signals obtained upon demodulation to supply the signals VSYNC to the control circuit 80. The circuit 36 is also designed to receive signals MUTE from the control unit 60 to blank out the effective horizontal scanning periods of the video signals for muting. It will be noted however that the function of converting the video signals into standard format signals is not essential to the present apparatus, but the processing circuit 36 may be designed to extract sync signals from the video signals sensed by the head 26 to simply supply these sync signals at the output 40 under the control of the control unit 60.

An envelope detection circuit 38 is designed to detect an envelope of the frequency-modulated video signals already recorded on the track of the recording surface 16 to produce corresponding output signals from an output 42. The circuit 38 is connected through an envelope amplifier 44 to an analog-to-digital converter (ADC) 46. In the present embodiment, the ADC 46 has 256 quantumizing steps and operates to produce the detected signals to the control unit 60 in the form of 8-bit data upon a demand from the control unit 60.

As will be described in detail hereafter, the control unit 60 takes charge of overall control of the present apparatus in response to the operation of the user, and may for instance be preferably implemented by a microprocessor system.

In the present embodiment, there are provided a power source switch PW for connecting and disconnecting the present apparatus to and from a power source, a playback key PL for instructing the start and stop of the present apparatus, a forward key FW for causing the head 26 to be transported radially in the direction of increasing track numbers, e.g. from the outer to the inner tracks, and a reverse key RV for causing the head 26 to be transported radially in the reverse direction. These switches or keys are connected to the control unit 60. The track numbers, designated by the operation of key FW or RV, are visualized on a display unit 48, such as LED or CRT display, connected to the control unit 60. The control unit 60 may of course be provided with an audible indication function, such as of producing audible alarms.

In the present embodiment, the stepping motor 30 is a four-phase pulse-driven motor which is rotated about 15 degrees in response to each driving pulse applied thereto. Hence, the stepping motor completes one revolution by 24 driving pulses. The head supporting unit 28 is designed to shift or transport the head 26 about 4.2 $\mu$m in the direction of the arrow R by each pulse supplied to the stepping motor 30. The excitation time interval for one pulse is 2 to 3 milliseconds, for example. Thus the head 26 is shifted about 100 $\mu$m by the 24 driving pulses.

The driving pulses are supplied from a driving circuit 50 consisting essentially of a current amplifier. The driving circuit 50 operates to generate driving pulses for the exciting coil windings of the stepping motor 30 in accordance with excitation patterns instructed by the control unit 60.

The control circuit 60 and the servo circuit 20 are responsive to the reference clocks generated by a reference clock generator (OSC) 62. In the present embodiment, the servo circuit 20 is supplied with the reference clock signals of 60 Hz, which is equal to the field rate of the raster scanning video signals recorded on the disk 10, and the control unit 60 is supplied with faster reference clocks of 3.58 MHz, for example.

In the present embodiment, envelope peak detecting autotracking control is carried out in the following manner. It is assumed that the magnetic head 26 is already positioned on a given track. Upon the operation of the key FW or RV, the control unit 60 causes the driving circuit 50 to start the stepping motor 30 for shifting the magnetic head 26 in the forward or reverse direction, as appropriate.

According to the present embodiment, the magnetic head 26 is first shifted in the forward or reverse direction a distance slightly shorter than the track pitch which is equal to 100 $\mu$m. For example, the head 26 is shifted a distance of 96 $\mu$m corresponding to 23 pulses. The envelope of the signals sensed then by the magnetic head 26 is detected by the detection circuit 38 to be introduced from ADC 46 into the control unit 60 in the form of digital data. The control unit 60 then causes the head 26 to be shifted a distance corresponding to one pulse. The envelope level of the signal sensed at this time by the magnetic head 26 is compared with that of the temporarily preceding signal.

In this manner, while causing the magnetic head 26 to be shifted radially, the control circuit 60 detects and compares the present envelope signal level with the temporarily preceding envelope signal level for determining the radial position associated with the peak envelope level. The head position associated with the thus detected envelope level peak represents the appropriate on-track position. The control unit 60 thus performs the envelope peak detecting autotracking.

Referring now to FIG. 3, the power source key PW is actuated so as to turn on the power source of the magnetic playback device at step 300. The control circuit 60 then issues the signal DISK so as to cause the servo circuit 20 to start the d.c. electric motor 12 at step 302. The rotation of the d.c. electric motor 12 is placed under servo control of the servo circuit 20 with the use of the frequency signals generated by the frequency generator 18. Thus the control unit 60 makes a check at step 304 to see when the rotational speed of the d.c. electric motor 12 has reached a predetermined speed.

The predetermined speed may be lower than the steady rotational speed of the d.c. electric motor 12, that is, it may be lower than the speed of 3,600 r.p.m. in the present example. In other words, the speed is so selected in the embodiment that, when the magnetic head 26 is moved in the radial direction R of the magnetic disk 10 with the magnetic head 26 projecting beyond the reference plane and slidingly contacting with the recording surface 16, the chance of an injury to the magnetic head 26 is relatively lower. For example, the speed of 2,000 r.p.m. is sufficient. It will be noted that, with the magnetic disk 10 rotating at such r.p.m., the mechanical load applied to the head 26 during radial movement thereof is markedly lower than what would otherwise be encountered during the standstill of the disk 10, so that the front part of the disk 10 would be unlikely to be injured with the radial travel of the magnetic head 26.

The control unit 60 then starts to scan the states of the keys, step 306. The scanning of the key states, or key scanning, is the operation in which control unit 60 scans the states of the keys such as PL, FW and RV and of the various sensors at predetermined intervals to sense them. After starting the d.c. electric motor 12 and until such a period of time that the motor reaches its steady operating state, the key scanning is performed in synchronism with the clocks generated by the oscillator 62; once the motor reaches the steady operating state, however, it is performed in synchronism with the timing pulses PG generated by the phase generator 22.

In the present embodiment, such key scanning is executed at field frequency, that is, at each vertical scanning period or 1V period of the raster scanning video signals recorded on the magnetic disk 16. When the system is in stability, the control unit 60 causes the power source indicator lamp or light emitting diode to be lighted while turning on the signal MUTE to inhibit the signals sensed by the magnetic head 26 to be produced to the output terminal 40.

In this manner, the control operation caused by the step 306 proceeds along the loop 312, while scanning the states of the various sensors and the keys PL, FW and RV to execute the processing operations pursuant to the sensed states.

For example, when supposed that the key FW or RV is sensed as already actuated at step 308, the control unit 60 causes the stepping motor 30 to be driven in the forward or backward directions, respectively, at step 310, for radially shifting the magnetic head 26 and executing the above described tracking. It will be noted that, in the present embodiment, when the rotation of the disk 10 reaches the aforementioned predetermined speed, the mechanical load applied to the head 26 during the shifting of the magnetic disk is markedly lower than what would otherwise be applied during standstill of the disk 10, so that there is little fear that the foremost part of the head 26 is injured upon shifting the head 26.

The embodiment described above is for the sake of illustration of the invention only, and those skilled in the art can change or modify the embodiment without departing from the scope and spirit of the present invention.

For example, in the above embodiment, the magnetic head 26 is transferred to a desired track position in response to the key FW or RV only after the disk reaches a certain rotational speed after the apparatus is connected to the power source. Alternatively, the magnetic head 26 may be returned to the original or starting position outside of the outermost track or inside of the innermost track after the magnetic disk 10 has reached a certain rotational speed after the apparatus is connected to the power source. It is to be noted that the present invention is applicable not only to the magnetic reproducing system as described above, but to a magnetic recording system as well. In the latter case, the magnetic head 26 may be transferred to an unrecorded track adjacent to the prerecorded track after the disk 10 has reached a certain rotational speed after the apparatus is connected to the power source.

It will be appreciated from the foregoing that the present invention provides for a sequence control in such a manner that the transfer of a magnetic head is enabled after the apparatus is powered on for setting a magnetic disk into rotation and then the magnetic disk reaches a certain speed of rotation. In this manner, the mechanical injury of the head chip which could otherwise be caused by the magnetic head upon starting the recording or reproducing apparatus is minimized.

What is claimed is:

1. A magnetic recording or reproducing apparatus for recording signals on or reproducing signals from a rotating sheet of magnetic recording medium, comprising:

driving means for driving the sheet of magnetic recording medium in stable rotation;

speed sensing means for sensing a rotational speed of the sheet of magnetic recording medium;

regulator means disposed on a surface of the sheet of magnetic recording medium, which surface is opposite to a recording surface of the magnetic recording medium, for holding the sheet of magnetic recording medium generally at a predetermined level;

a magnetic head disposed on the recording surface of the magnetic recording medium and opposing said regulator means for recording signals on or sensing signals from the magnetic recording medium, said magnetic head being protruded in such a fashion that a tip of said magnetic head and a portion of the sheet of magnetic recording medium is beyond the predetermined level toward said regulator means both before and after start up of recording or sensing by said magnetic head;

head transporting means for transporting said magnetic head radially across the recording surface of the sheet of magnetic recording medium; and control means operative in response to said speed sensing means for controlling said driving means and said head transporting means for causing said magnetic head to be transported onto desired ones of tracks of the sheet of magnetic recording medium;

said control means, when powered on, causing said driving means to rotate the sheet of magnetic recording medium, and inhibiting said head transporting means from transporting said magnetic head until the rotational speed of the sheet of magnetic recording medium sensed by said speed sensing means reaches a predetermined value.

2. Apparatus according to claim 1 wherein said predetermined value is set lower than a speed accomplished in a stavel rotation of the sheet of magnetic medium.

3. Apparatus according to claim 2 wherein, the sheet of magnetic recording medium comprises a magnetic disk having tracks on each of which a field of color video signals including frequency modulated luminance, chrominance and synchronizing signals are to be recorded;

said driving means comprising a dc electric motor adapted to rotate the disk at a constant rotational speed of 3,600 r.p.m.

4. Apparatus according to claim 3 wherein said head transporting means comprises:

a stepping motor adapted to be turned 15 degrees in response to an exciting pulse;

means responsive to said control means for producing the exciting pulses to said stepping motor; and head supporting means driven by said stepping motor for movably supporting said magnetic head to radially transport said magnetic head by 1/24 of the pitch of the tracks for each of the exciting pulses.

5. Apparatus according to claim 3 further comprising servo control means operative in response to said control means for effecting servo control on said motor at the stable rotational speed.

* * * * *